US012427642B2

(12) United States Patent
Haigis et al.

(10) Patent No.: US 12,427,642 B2
(45) Date of Patent: Sep. 30, 2025

(54) HAND-HELD POWER TOOL WITH A FASTENING REGION FOR A SAFETY LOOP

(71) Applicant: Robert Bosch GmbH, Stuttgart (DE)

(72) Inventors: Michael Haigis, Merklingen (DE); Andre Ullrich, Leinfelden-Echterdingen (DE); Maximilian Weinbrecht, Altdorf (DE); Michael Weiss, Stuttgart (DE); Nadine Mutlu, Weil Im Schoenbuch (DE); Selim Mustafa, Waiblingen (DE); Vincent Hasenmayer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/442,832

(22) Filed: Feb. 15, 2024

(65) Prior Publication Data

US 2024/0278412 A1 Aug. 22, 2024

(30) Foreign Application Priority Data

Feb. 16, 2023 (DE) ..................... 10 2023 201 336.3

(51) Int. Cl.
*B25F 5/00* (2006.01)
*B25F 5/02* (2006.01)

(52) U.S. Cl.
CPC ...................................... *B25F 5/02* (2013.01)

(58) Field of Classification Search
CPC ..................................... B25F 5/00; B25F 5/02
See application file for complete search history.

(56) References Cited

U.S. PATENT DOCUMENTS

| | | | | | |
|---|---|---|---|---|---|
| 11,498,238 | B2 * | 11/2022 | Huber | B25F 5/02 | |
| 2009/0236111 | A1 * | 9/2009 | Hahn | B25D 17/043 | 173/162.2 |
| 2009/0266570 | A1 * | 10/2009 | Hashimoto | B25D 16/00 | 173/112 |
| 2009/0277659 | A1 * | 11/2009 | Roelfs | B25D 17/24 | 173/217 |
| 2009/0283282 | A1 * | 11/2009 | Zimmermann | B25F 5/006 | 173/162.2 |
| 2009/0288851 | A1 * | 11/2009 | Hamano | B25D 17/06 | 173/122 |
| 2010/0263893 | A1 * | 10/2010 | Fischer | B25D 17/043 | 173/162.2 |
| 2020/0194747 | A1 * | 6/2020 | Rudolph | B25H 3/00 | |
| 2020/0215668 | A1 * | 7/2020 | Duncan | B25B 21/02 | |
| 2020/0262047 | A1 * | 8/2020 | Numata | B25F 5/02 | |
| 2021/0107130 | A1 * | 4/2021 | Yoshikane | B25H 3/00 | |
| 2021/0154880 | A1 | 5/2021 | Osawa et al. | | |
| 2022/0203514 | A1 * | 6/2022 | Dennis | B25F 5/006 | |
| 2023/0088100 | A1 * | 3/2023 | Murakami | H01M 50/264 | 429/163 |

FOREIGN PATENT DOCUMENTS

DE 10 2020 216 582 A1 6/2022

* cited by examiner

*Primary Examiner* — Eyamindae C Jallow
(74) *Attorney, Agent, or Firm* — Maginot, Moore & Beck LLP

(57) ABSTRACT

A hand-held power tool includes a housing in which a drive unit for actuating a tool holder is arranged. The housing forms a handle for holding the hand-held power tool. At least one fastening region is associated with the housing to which a safety loop for securing the hand-held power tool against falling can be fastened. The at least one fastening region has an optical and/or haptic marking element for marking the at least one fastening region.

10 Claims, 3 Drawing Sheets

HAND-HELD POWER TOOL WITH A FASTENING REGION FOR A SAFETY LOOP

This application claims priority under 35 U.S.C. § 119 to patent application no. DE 10 2023 201 336.3, filed on Feb. 16, 2023 in Germany, the disclosure of which is incorporated herein by reference in its entirety.

BACKGROUND

The present disclosure relates to a hand-held power tool having a housing in which a drive unit for actuating a tool holder is arranged, wherein the housing forms a handle for holding the hand-held power tool, and wherein the housing is assigned at least one fastening region to which a safety loop for securing the hand-held power tool against falling can be fastened.

A hand-held power tool is known from the prior art, which has a housing in which a drive unit for actuating a tool holder is arranged. The housing forms a handle for holding the hand-held power tool. Furthermore, at least one fastening region is assigned to the housing, to which a safety loop for securing the hand-held power tool against falling can be fastened.

SUMMARY

The disclosure relates to a hand-held power tool having a housing in which a drive unit for actuating a tool holder is arranged, wherein the housing forms a handle for holding the hand-held power tool, and wherein the housing is assigned at least one fastening region to which a safety loop for securing the hand-held power tool against falling can be fastened. The at least one fastening region has an optical and/or haptic marking element for marking the at least one fastening region.

The disclosure thus makes it possible to provide a hand-held power tool in which the at least one optical and/or haptic marking element can be used to enable easily recognizable marking of the at least one fastening region. This allows a correct and safe arrangement of a safety loop on the at least one fastening region intuitively.

The optical and/or haptic marking element is preferably designed as a depression.

This makes it easy to provide a suitable optical and/or haptic marking element.

Preferably, the optical and/or haptic marking element is enclosed by a groove, wherein a region is formed within the groove that differs haptically from a surrounding region of the groove formed by the housing.

This means that an alternative optical and/or haptic marking element can be provided easily and simply.

According to one embodiment, the at least one fastening region is assigned to the handle.

This enables a practical and targeted arrangement of a safety loop.

Preferably, the optical and/or haptic marking element is arranged on the handle on a side facing the tool holder, a side facing away from the tool holder, and/or a side surface aligned perpendicular to a longitudinal direction of the tool holder.

This makes it easy to position the optical and/or haptic marking element appropriately on the handle.

Preferably, the at least one fastening region is arranged in a connecting region between the handle and a receiving region for a battery pack connected to the handle.

In this way, the hand-held power tool can be effectively prevented from falling by the safety loop.

The handle is preferably tapered in the at least one fastening region.

This makes it easy and uncomplicated to provide an optical and/or haptic marking element.

Preferably, the at least one fastening region is spaced apart from a main holding section of the handle to be gripped by a user.

Thus, an arrangement of the at least one fastening region can be made possible in a simple manner.

According to one embodiment, the handle is arranged at an angle on the housing.

This enables a safe and reliable arrangement of the handle for operation of the hand-held power tool.

According to one embodiment, the hand-held power tool is designed as a hammer drill.

Thus, a hammer drill can be provided in a simple manner, wherein the at least one optical and/or haptic marking element enables an easily recognizable marking of the at least one fastening region, wherein a correct and safe arrangement of a safety loop on the at least one fastening region can be carried out intuitively.

The present disclosure further relates to a system comprising a hand-held power tool and an auxiliary handle. The auxiliary handle has at least one fastening region, which has an optical and/or haptic marking element for marking the at least one fastening region.

The disclosure thus makes it possible to provide a system with a hand-held power tool and an auxiliary handle, wherein the at least one optical and/or haptic marking element makes it possible to mark the at least one fastening region in an easily recognizable manner, wherein a correct and safe arrangement of a safety loop on the at least one fastening region can be carried out intuitively.

BRIEF DESCRIPTION OF THE DRAWINGS

The disclosure is explained in further detail in the following description with reference to exemplary embodiments shown in the drawings. Shown are.

Elements having the same or a comparable function are provided with the same reference characters in the drawings and are described in detail only once.

DETAILED DESCRIPTION

Figure 1:
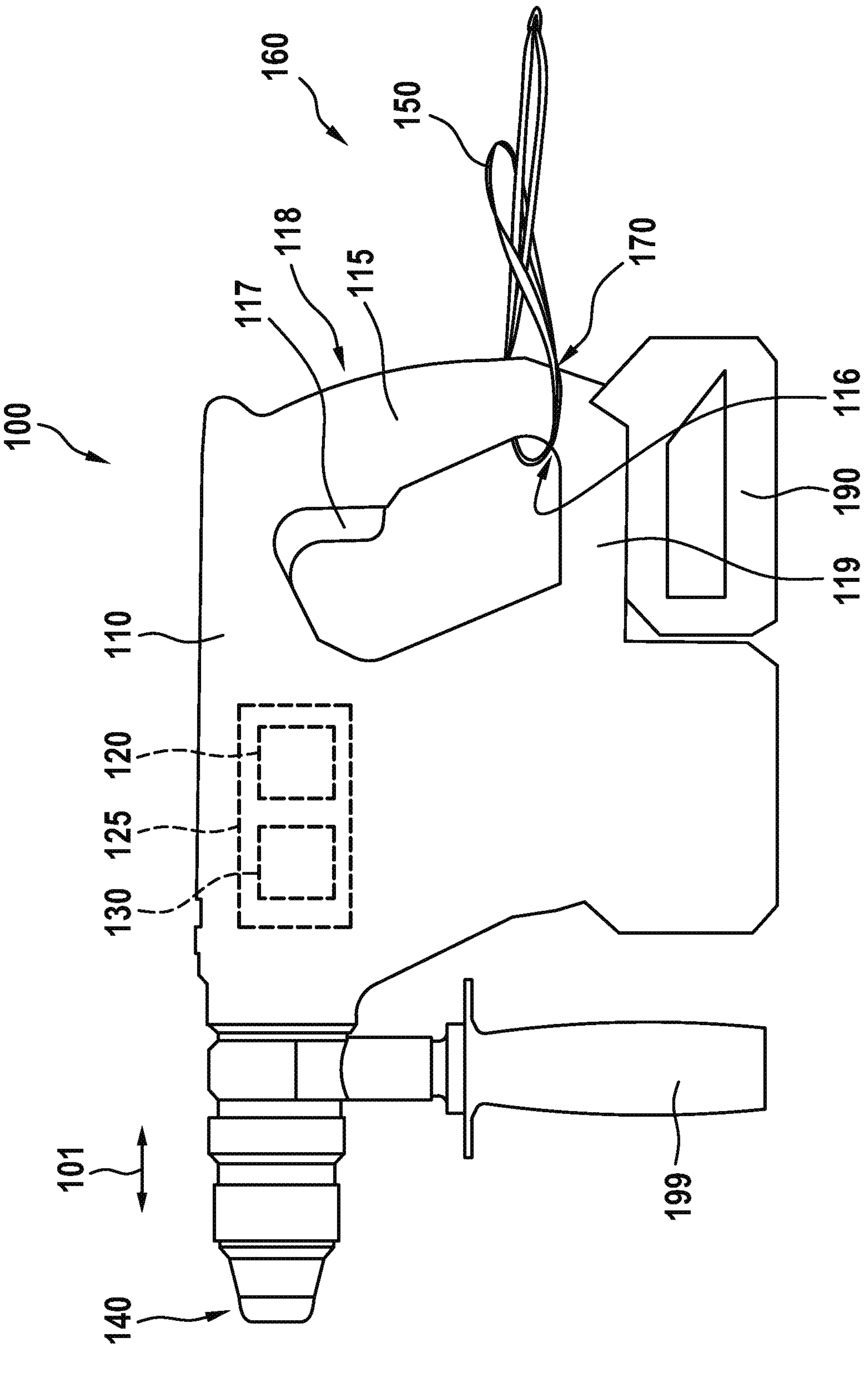
FIG. 1 a schematic view of a hand-held power tool with a fastening region and a safety loop arranged at the fastening region, FIG. 2 five sections (A) to (E) of the hand-held power tool in FIG. 1 with different marking areas, FIG. 3 an enlarged section of a handle associated with the hand-held power tool of FIG. 1 and FIG. 2 with the marking element of FIG. 2(E), viewed from a rear side, and FIG. 4 a side view of the handle of FIG. 3 with the marking element of FIG. 2(E) and FIG. 3.

FIG. 1 shows a hand-held power tool 100 with a housing 110, in which a drive unit 125 is arranged for actuating a tool holder 140, which illustratively has a longitudinal direction 101. The housing 110 can have two housing half shells or alternatively be designed for cup mounting.

At least one drive motor 120 is assigned to the drive unit 125 to actuate the tool holder 140. Preferably, the drive unit 125 also has a transmission 130. The drive motor 120 can be an electronically commutated motor. The drive motor 120 can preferably be switched on and off via a manual switch

117, wherein the manual switch 117 is illustratively arranged on a handle 115 of the housing 110.

The handle 115 is formed to hold the hand-held power tool 100 and is preferably formed by the housing 110. Preferably, the handle 115 is arranged at an angle on the housing 110. Preferably, the manual switch 117 is arranged on a main holding section 118 of the handle 115 to be gripped by a user of the hand-held power tool 100.

Furthermore, the housing 110, in particular the handle 115, illustratively comprises a connecting region 116 arranged between the handle 115 and a receiving region 119 connected to the handle 115. The receiving region 119 is connected to the housing 110 and the handle 115.

A battery pack 190 is illustratively arranged at a portion of the receiving region 119 facing away from the handle 115. The battery pack 190 is mechanically and electrically connected to the hand-held power tool 100 for mains-independent power supply of the hand-held power tool 100. However, the hand-held power tool 100 may also have a mains-dependent power supply.

The hand-held power tool 100 is preferably designed as a hammer drill. For this purpose, a suitable striking mechanism driven by the drive unit 125 can be assigned to the tool holder 140. However, it is pointed out that suitable striking mechanisms are sufficiently known from the prior art and are therefore not described further here. Furthermore, it is pointed out that the hand-held power tool 100 may also be designed as any other hand-held power tool, for example as a screwdriver or saw.

To secure the hand-held power tool 100 against falling, at least one fastening region is associated with the housing 110, to which a safety loop can be attached. Illustratively, a fastening region 170 is provided, on which a safety loop 150 is arranged as an example. According to the disclosure, the fastening region 170 has an optical and/or haptic marking element (210, 220, 230, 240, 250, 260 in FIG. 2) for marking the at least one fastening region 170.

According to one embodiment, the fastening region 170 is associated with the handle 115. Here, the fastening region 170 is preferably arranged at the connecting region 116 between the handle 115 and the receiving region 119. However, it should be noted that the fastening region 170 may also be arranged at any other position on the housing 110.

Preferably, the fastening region 170 or its immediate surroundings has a smaller diameter or circumference than a region surrounding it or them. Illustratively, the handle 115 is tapered in the fastening region 170. Further, the fastening region 170 is preferably spaced apart from the main holding section 118 of the handle 115 of the hand-held power tool 100.

Furthermore, an auxiliary handle 199 is illustratively associated with the hand-held power tool 100 and is, by way of example, attached to the housing 110. Preferably, the hand-held power tool 100 forms a system 160 with an accessory component, e.g., the auxiliary handle 199. Here, the fastening region 170 may also be arranged on the accessory component, e.g., the auxiliary handle 199, or another component of the hand-held power tool 100, e.g., the battery pack 190. In addition, it is noted that a plurality of fastening regions 170 may also be present.

Figure 2:
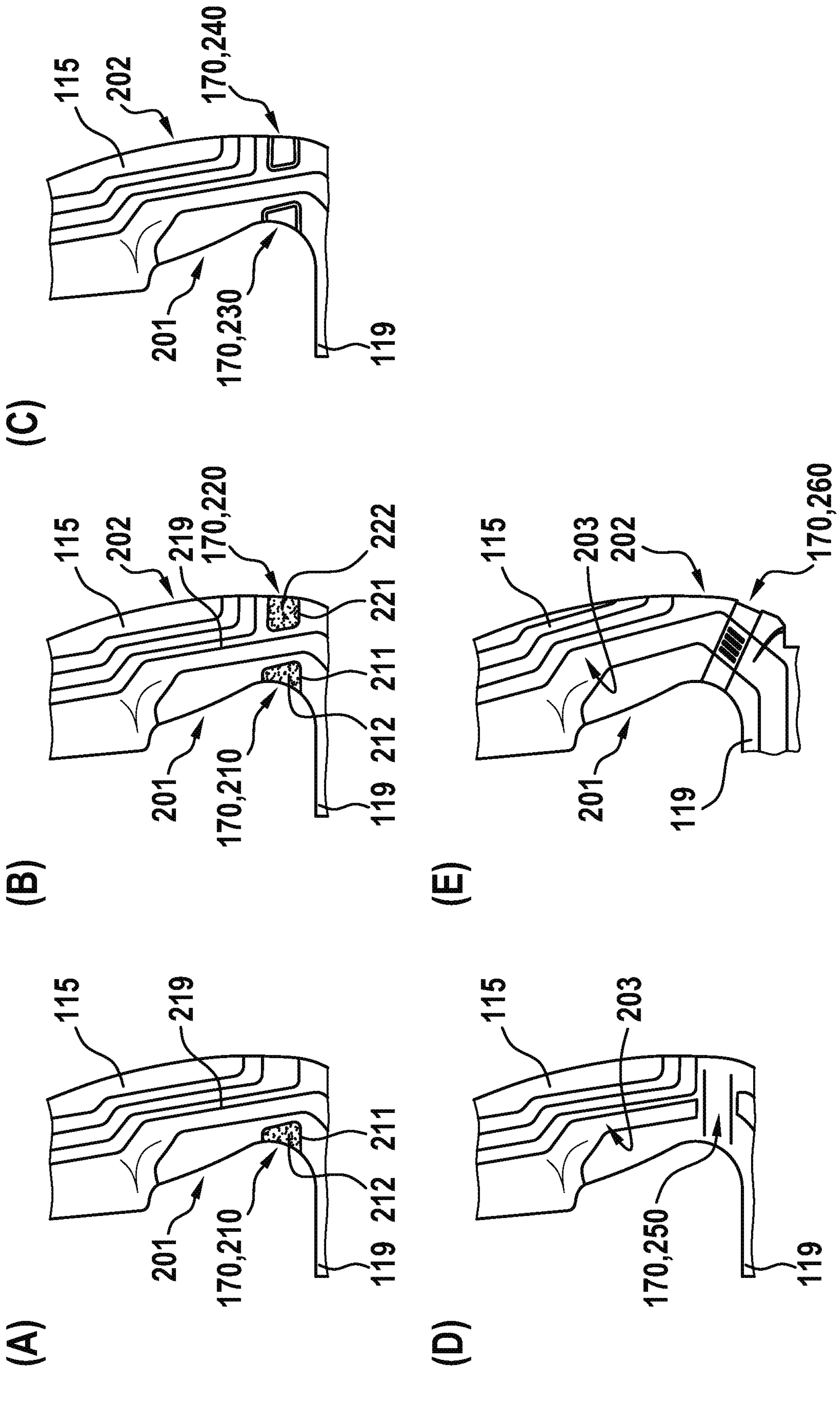

FIG. 2 shows the handle 115 of FIG. 1 with five different embodiments (A) to (E) of optical and/or haptic marking elements 210, 220, 230, 240, 250, 260 at the fastening region 170.

In this case, the optical and/or haptic marking element 230, 240, 250, 260 can be formed as a depression. Alternatively or optionally, the optical and/or haptic marking element 210, 220 can be enclosed by a groove 211, 221. In this case, a region 212, 222 is preferably formed within the groove 211, 221 which is haptically different from a surrounding region 219 of the groove 211, 221 formed by the housing 110. In general, the optical and/or haptic marking element 210, 220, 230, 240, 250, 260 can be arranged on the handle 115 on a side 201 arranged facing the tool holder 140, on a side 202 arranged facing away from the tool holder 140, and/or on a side surface 203; 303 aligned perpendicular to a longitudinal direction 101 of FIG. 1 of the tool holder 140.

In FIG. 2(A), the marking element 210 is illustratively arranged on the side 201 of the handle 115 facing the tool holder 140. Here, the marking element 210 has, by way of example, a groove 211 which surrounds a region 212 that is haptically different from a surrounding region 219 of the groove 211 formed by the housing 110.

In FIG. 2(B), the handle 115 has the marking element 210 of FIG. 2(A) as well as the marking element 220. By way of example, the marking element 220 is arranged on a side 202 of the handle 115 facing away from the tool holder 140 of FIG. 1. Illustratively, the marking element 220 is arranged opposite the marking element 210. Here, the marking element 220 is illustratively formed with a groove 221 and a haptically distinct region 222 within the groove 221, analogous to the marking element 210.

FIG. 2(C) illustratively shows two oppositely arranged marking elements 230, 240. By way of example, a marking element 230 is arranged on the side 201 of the handle 115 facing the tool holder 140 and a marking element 240 is arranged on the side 202 of the handle 115 facing away from the tool holder 140 of FIG. 1. Here, the two marking elements 230, 240 are illustratively formed as depressions.

In FIG. 2(D), a further marking element 250 is shown. The marking element 250 is, by way of example, arranged on a side surface 203 (303 in FIG. 3) aligned perpendicular to the longitudinal direction 101 of the tool holder 140 of FIG. 1. The marking element 250 is illustratively formed as a depression.

In FIG. 2(E), an alternative marking element 260 is shown. The marking element 260 is arranged, by way of example, on the side 201, 202 as well as the sides 203 and (303 in FIG. 3), i.e., along a circumference of the fastening region 170. The marking element 260 is illustratively formed as a depression.

It is noted that the marking elements 230, 240, 250, 260 formed as a depression may also additionally have a region within the respective depression that is haptically different from the surrounding region 219. Furthermore, it is pointed out that the marking elements 210, 220, 230, 240, 250, 260 can also be combined. For example, the marking elements 210, 220, 230, 240 can be combined with the marking element 250. Also, differently configured marking elements 210, 220, 230, 240, 250, 260 can be arranged on the housing 110 and/or an accessory component.

Figure 3:
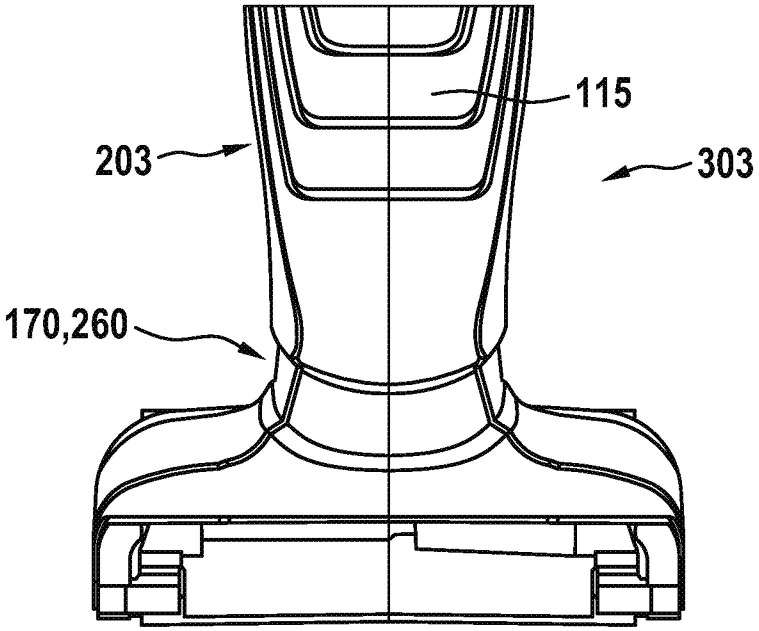

FIG. 3 shows the handle 115 of FIG. 1 and FIG. 2 with the fastening region 170 and the marking element 260 of FIG. 2(E). Here, FIG. 3 also illustrates the arrangement of the marking element 260 on a side 303 opposite the side 203. Preferably, the marking element 260 is arranged or formed along the entire circumference of the fastening region 170, as described above. It should be noted that, for example, the marking element 250 of FIG. 2(D) may also be arranged on the side 203 and/or the side 303.

Figure 4:
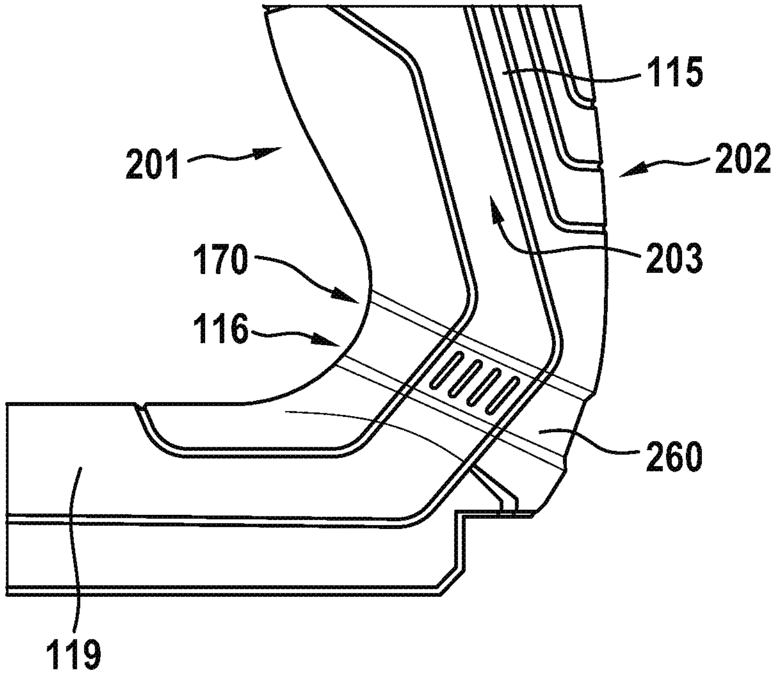

FIG. 4 shows the handle 115 of FIG. 1 to FIG. 3 with the marking element 260 of FIG. 2(E). FIG. 4 illustrates the connecting region 116, which is arranged between the handle 115 and the receiving region 119 and connects them to one another.

What is claimed is:

1. A hand-held power tool comprising:

a housing;

a tool holder; and a drive unit arranged in the housing and configured to actuate the tool holder, wherein:

the housing is configured to form a handle for holding the hand-held power tool, the housing includes at least one fastening region configured to receive a safety loop for securing the hand-held power tool against falling, the at least one fastening region has a marking element configured as an optical marking element, a haptic marking element, or an optical and haptic marking element for marking the at least one fastening region, the marking element is enclosed by a groove, and a region haptically different from a surrounding region of the groove formed by the housing is formed within the groove.

2. The hand-held power tool according to claim 1, wherein the optical and/or haptic marking element includes a depression.

3. The hand-held power tool according to claim 1, wherein the at least one fastening region is arranged on the handle.

4. The hand-held power tool according to claim 3, wherein the marking element is arranged on the handle in at least one of the following positions:

on a side arranged facing the tool holder, on a side arranged facing away from the tool holder, and on a side surface aligned perpendicularly to a longitudinal direction of the tool holder.

5. The hand-held power tool according to claim 3, wherein the at least one fastening region is arranged in a connecting region between the handle and a receiving region for a battery pack connected to the handle.

6. The hand-held power tool according to claim 3, wherein the handle is tapered in the at least one fastening region.

7. The hand-held power tool according to claim 3, wherein:

the handle includes a main holding section configured to be gripped by a user, and the at least one fastening region is spaced apart from the main holding section.

8. The hand-held power tool according to claim 3, wherein the handle is arranged angled on the housing.

9. The hand-held power tool according to claim 1, wherein the hand-held power tool is designed as a hammer drill.

10. A system, comprising:

a hand-held power tool; and an auxiliary handle having at least one fastening region that has a marking element configured as an optical marking element, a haptic marking element, or an optical and haptic marking element which is configured to mark the at least one fastening region, wherein:

the at least one fastening region is configured for fastening a safety loop for securing the hand-held power tool against falling, the marking element is enclosed by a groove, and a region haptically different from a surrounding region of the groove formed by the housing is formed within the groove.

* * * * *